J. SCHIES.
APPARATUS FOR FEEDING AND DELIVERING GLASS.
APPLICATION FILED AUG. 28, 1914.

1,312,876.

Patented Aug. 12, 1919.

Witnesses:
Jacob A. Hollander
Theresa M. Silber

Inventor:
John Schies,
by B. F. Herboleb,
His Attorney

J. SCHIES.
APPARATUS FOR FEEDING AND DELIVERING GLASS.
APPLICATION FILED AUG. 28, 1914.

1,312,876.

Patented Aug. 12, 1919.

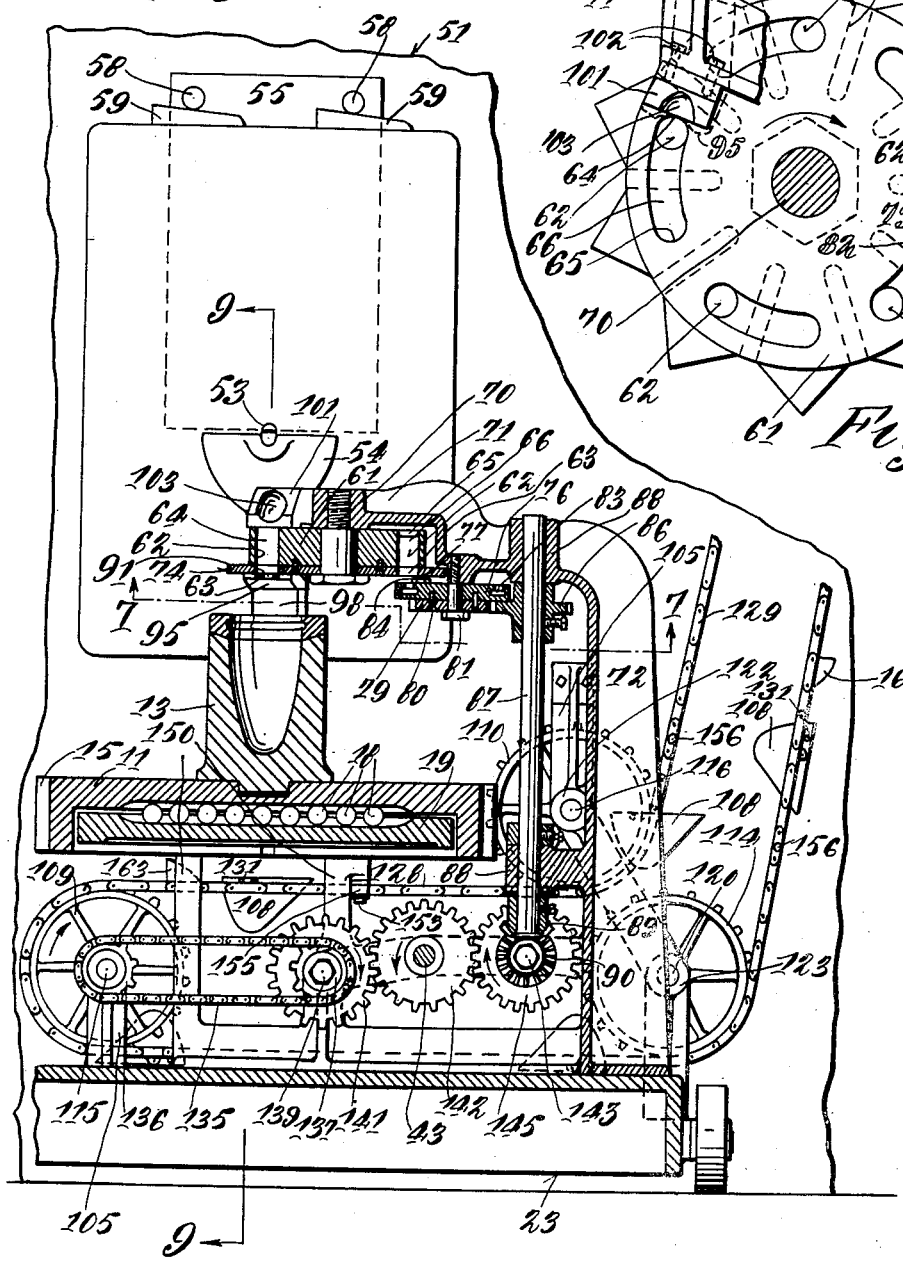

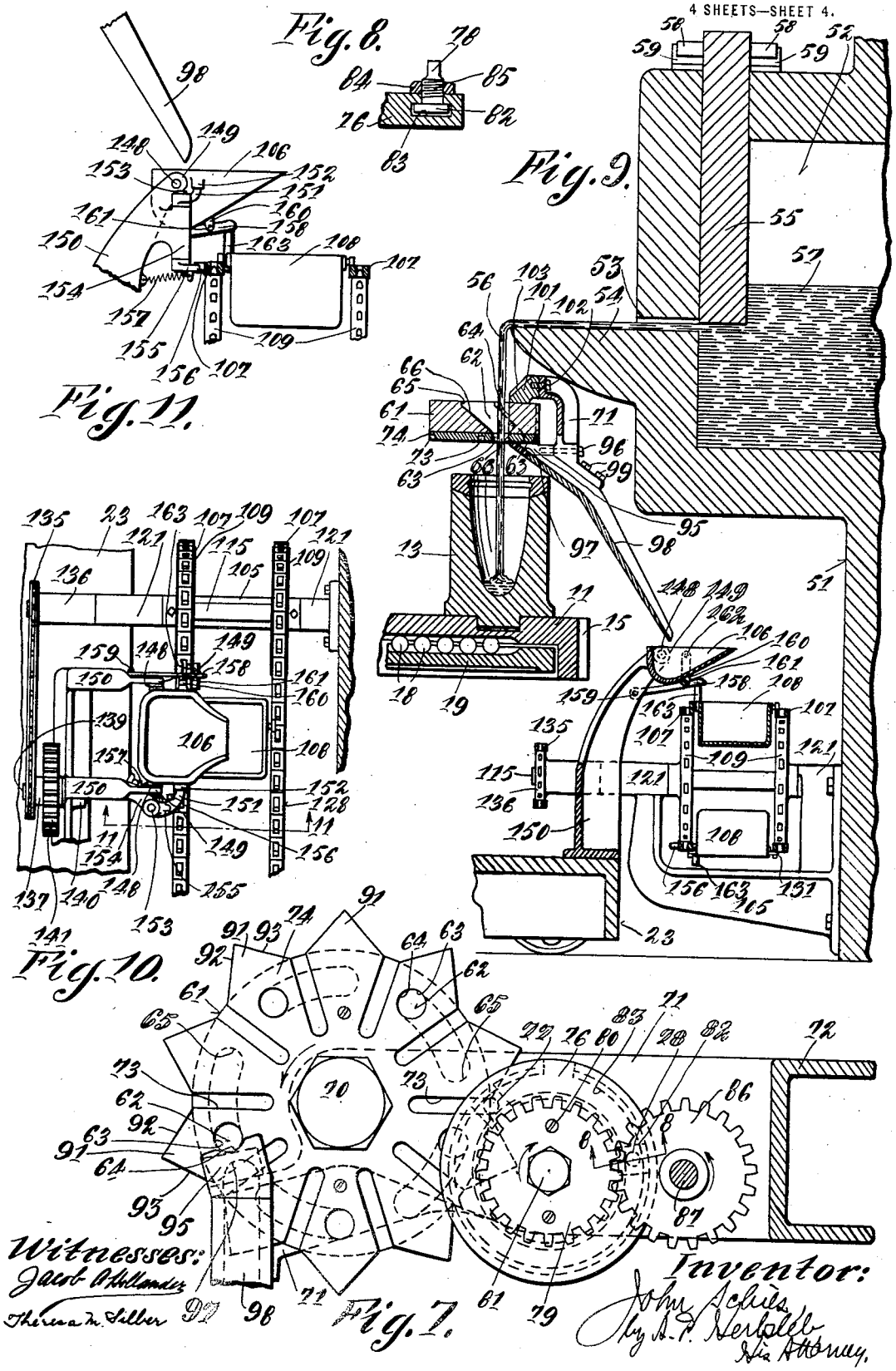

UNITED STATES PATENT OFFICE.

JOHN SCHIES, OF ANDERSON, INDIANA.

APPARATUS FOR FEEDING AND DELIVERING GLASS.

1,312,876.  Specification of Letters Patent.  Patented Aug. 12, 1919.

Application filed August 28, 1914. Serial No. 859,099.

*To all whom it may concern:*

Be it known that I, JOHN SCHIES, a citizen of the United States, residing at Anderson, in the county of Madison and State of Indiana, have invented certain new and useful Improvements in Apparatus for Feeding and Delivering Glass, of which the following is a specification.

My invention relates to apparatus for feeding and delivering glass-metal from a suitable melting pot or furnace to a forming device, such as a press-mold, blow-mold or the like, and consists in providing means whereby the glass-metal is supplied direct from the glass-furnace to the forming device for supplying the forming device with a wholly fresh supply of glass-metal.

For pressing and blowing glass articles it is a prerequisite that the glass metal upon which the pressing or blowing action is to take place shall be of homogeneous fluidity. Glass-metal readily becomes chilled, and the chilling has the effect of leaving marks, lines or seams in the made article, or producing an article of uneven thickness.

It is the object of my invention to provide novel means whereby chilling of the glass-metal is avoided by a substantially continuous flow of glass-metal into the mold for the article to be made; further to provide novel means for directing a substantially continuous flow of glass-metal selectively into the mold or molds or outside of the mold or molds; further to provide means whereby a substantially continuous flow of molten glass-metal is selectively directed into the mold or molds for being made into the glass article or outside the mold or molds for being returned to the furnace; further to provide novel means for directing the flow of glass-metal; and, further, to provide novel arrangements of parts whereby the flow of glass-metal is controlled and selectively directed into the mold or molds or returned to the furnace.

The invention will be further readily understood from the following description and claims, and from the drawings, in which latter:

Fig. 5 is a vertical longitudinal section illustrating the present exemplification of my invention, taken on the line 5—5 of Fig. 1.

Fig. 6 is a plan view of the feed-block, with its knives in position.

Fig. 7 is a bottom sectional view of the glass-metal manipulating means, taken on a line corresponding to the line 7—7 of Fig. 5.

Fig. 8 is a detail in cross-section on the line 8—8 of Fig. 7.

Fig. 9 is a vertical cross-section taken on a line corresponding to the line 9—9 of Fig. 5.

Fig. 10 is a plan view detail showing the means for dropping the glass-metal into the conveyer; and, Fig. 11 is a cross-sectional detail of the same on the line 11—11 of Fig. 10, showing also the position of the delivery spout with relation thereto.

Figure 1:
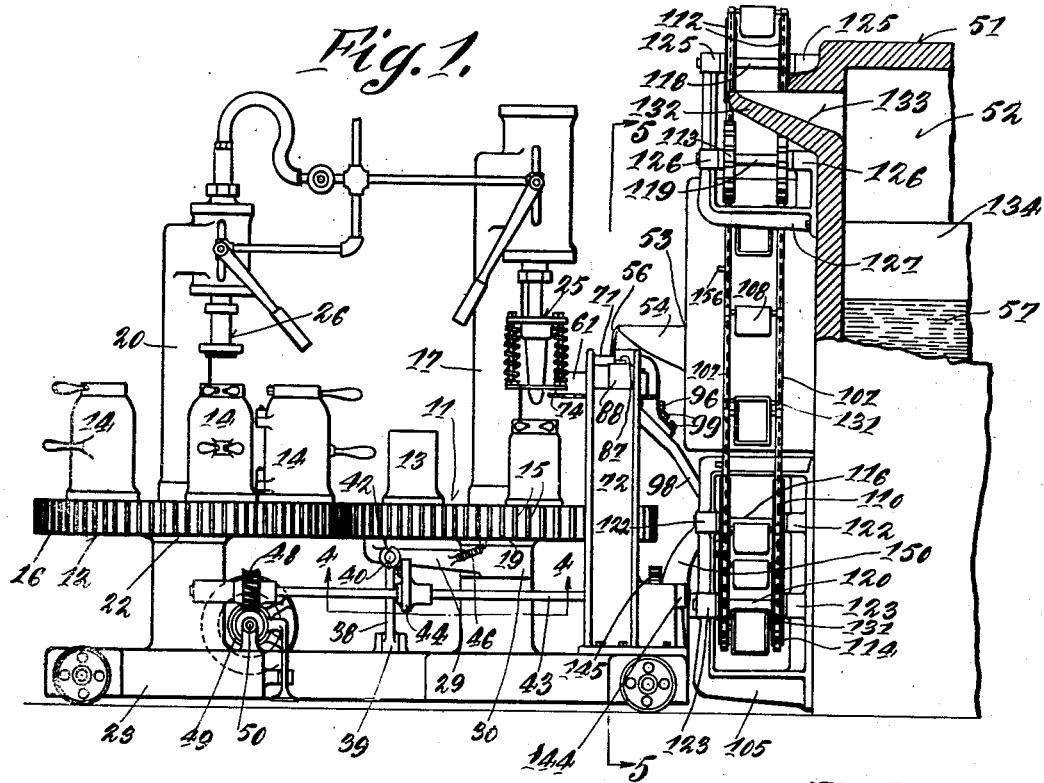
Figure 1 is an end elevation of an exemplification of my invention, in connection with a glass-blowing machine of ordinary form, shown in side elevation, and with a glass-furnace, shown partly broken away for better illustration of parts.
Figure 2:
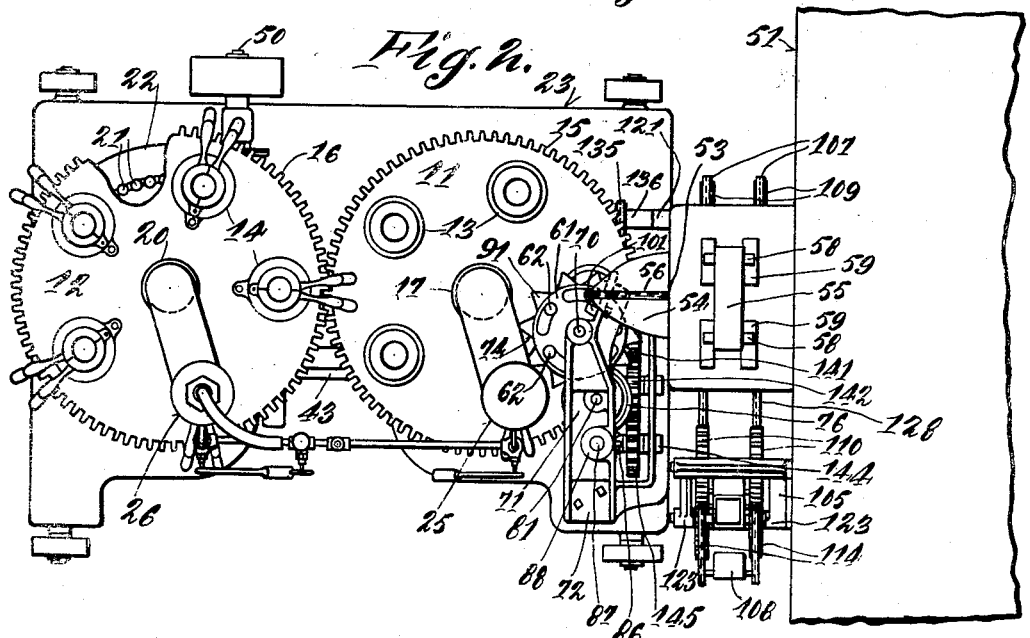
Fig. 2 is a plan view of the same.
Figure 3:
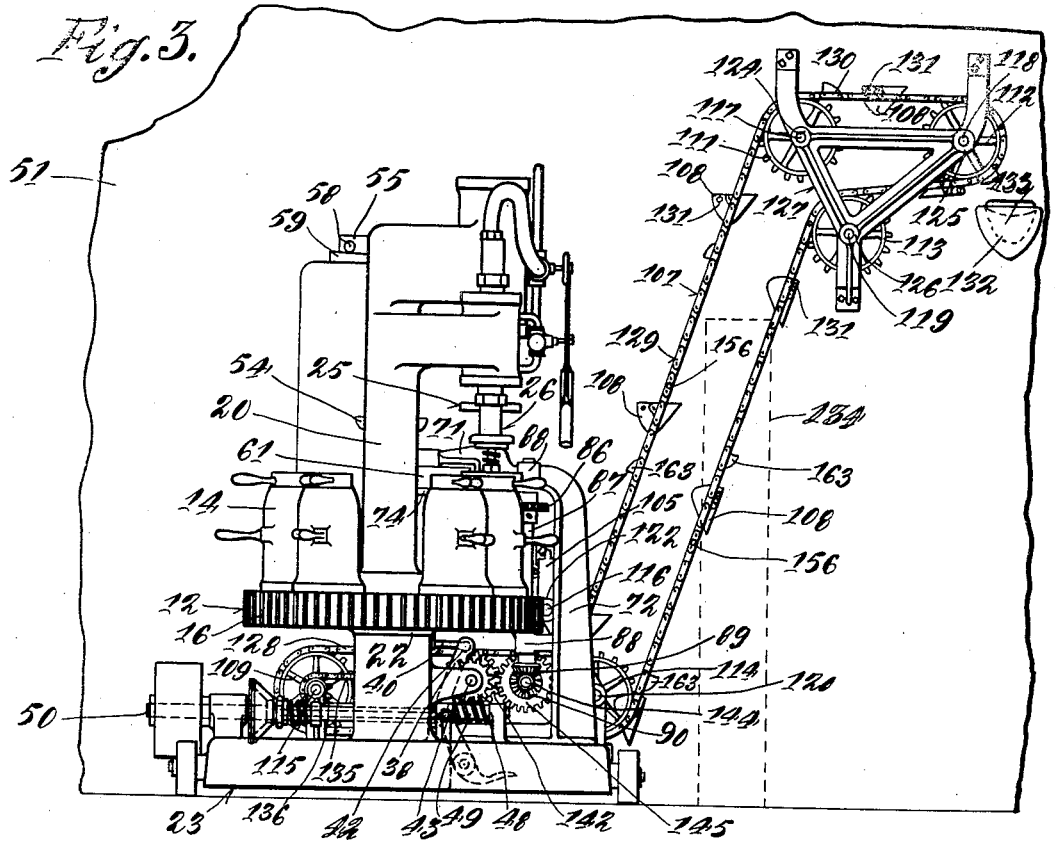
Fig. 3 is a side elevation of my improved device, shown in connection with the glass-blowing machine and the glass-furnace, shown in side elevation, the furnace being partly broken away.
Figure 4:
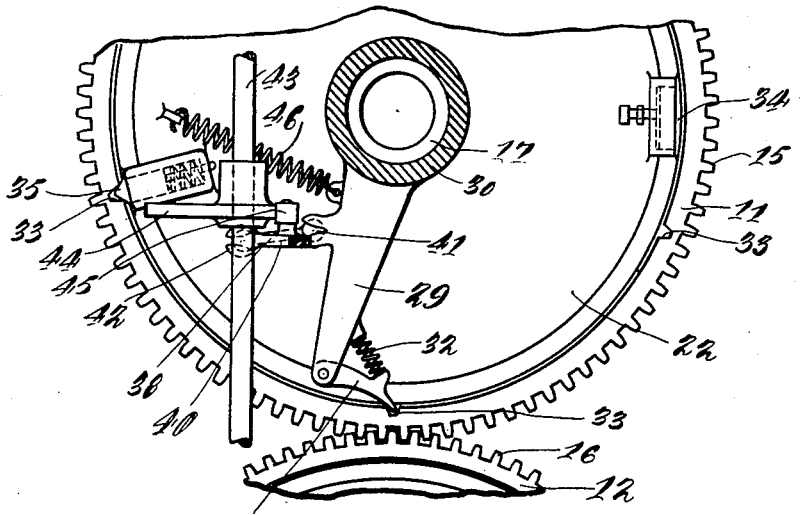
Fig. 4 is a bottom view of the table-operating means for the glass-blowing machine, taken on the line 4—4 of Fig. 1.

My invention is applicable in relations where it is desired to deliver a predetermined amount of glass-metal for subsequent operation, for instance, in a usual glass-pressing or blowing machine, and provides means whereby a continuously fresh flow of glass-metal into the mold, instanced as a press-mold, is insured. A glass-pressing or blowing machine usually comprises a table or tables arranged to revolve, on which suitable press-molds or combined press and blow-molds are arranged, suitable means being provided for causing intermittent movement of the table or tables for presenting the molds to suitable pressing or pressing and blowing devices. I have shown my invention in connection with a machine of this type, an example of which is shown and described in Letters Patent No. 722,634, granted me March 10, 1903.

The machine herein exemplified embodies a press-mold table 11 and a blow-mold table 12, a suitable number of press-molds 13 being supported by the press-mold table, located equal angular distances apart about the table, five molds being instanced. A similar number of blow-molds 14 is shown mounted on the blow-mold table. The tables are arranged to rotate intermittently in unison, having suitable driving connection between them, shown as spur-teeth 15, 16. The press-mold table rotates about a post 17 on balls 18 annularly arranged on an annular shelf 19 secured to the post. The blow-mold table rotates about a post 20 on balls 21 annularly arranged on an annular shelf 22 secured to said post. The posts extend upwardly from the frame 23 of the machine.

The press-molds are arranged to be successively intermittently brought into coacting position under a plunger 25, which is arranged to press the glass-metal in the press-mold thereunder, and the blow-molds are arranged to be brought into intermittent and successive coacting positions under a suitable blow-head 26, for blowing the previously pressed blank, which has in the meantime been suitably transferred to the blow-mold. The means for operating the plunger and the blow-head may be of any ordinary type known in the art, or as exemplified in my aforesaid Letters Patent.

I have shown the successive intermittent movements of the tables accomplished by means of an arm 29 pivoted on a bearing 30 about the post 17 and having a ratchet 31 pivoted at the outer end of said arm and normally urged by a spring 32 into normal engagement with the walls of recesses 33 adjacent to the periphery of the press-mold table. The table has a rotary movement imparted thereto at each intermittent movement thereof, equal to the angular distance between adjacent press-molds, for positioning the press-molds successively under the plunger. A suitable brake 34 prevents overthrow of the table, and a spring-pressed positioning-pin 35 is received in the recesses 33 for correctly positioning the press-molds under the plunger.

The arm 29 is actuated by a lever 38 pivoted to the frame at 39 and a link 40 articulated with the arm 29 by articulation 41 and with the lever by articulation 42. A shaft 43 has a cam 44 thereon arranged to contact a roller 45 on the lever 38 for effecting the advance movements of the tables, the lever being retracted by a spring 46.

The shaft 43 is shown driven by means of a worm-wheel 48 actuated by a worm 49 on a drive-shaft 50 suitably driven, as by a pulley having suitable clutch-connection with said shaft. The parts above described may be of suitable or ordinary construction and are illustrated as an exemplification of a machine in connection with which my improved device may be employed.

The glass-metal is maintained in suitable molten condition in a suitable receptacle, represented as a glass-furnace 51, provided with a molten glass-chamber 52 having a delivery-mouth 53 from which a delivery-lip 54 extends. A suitable adjustable choke 55 is provided for controlling the stream 56 of the glass-metal received from the mass 57 of molten glass-metal. The choke is adjusted by being provided with pins 58 with which wedge-pieces 59 adjustably engage, the wedge-pieces being movable on the top of the chamber 52.

61 represents a feed-block which is interposed between the mouth of the glass-metal furnace and the mold or molds into which the stream of glass-metal is to be received. The feed-block is provided with one or more feed-passages 62, five of these feed-passages being shown. Each feed-passage is provided with a discharge-opening 63, and is preferably arranged so that at one end thereof, instanced as the end 64, the glass-metal flows from the mouth of the glass-furnace through said feed-passage into the mold, the other end 65 of the feed-passage being arranged to receive the flow of molten glass from the mouth of the glass-furnace and to deflect the same away from the mold. The end 64 is shown as forming an upright feed-passage, whereas the end 65 is shown as provided with a sloping wall 66 for directing the molten glass into the discharge-opening.

In the present exemplification, the feed-block is rotatable upon a stud 70 depending from a bracket 71 extending from an upright 72 of the main frame. It is shown rotated by being provided with radial slots 73, shown formed in a plate 74 rigid with the feed-block for forming part thereof, the discharge-openings 63 of the feed-block being located in this plate. A disk 76 is provided with pins 77, 78, and has a gear 79 secured thereto, as by screws 80. The disk and gear rotate together about a stud 81 depending from the bracket 71. The pins are shown adjustable about the disk, as by being provided with heads 82 received in an annular T-slot 83 in said disk, and securely held therein by means of nuts 84 received about the threaded portions 85 of the shanks of said pins.

The gear 79 is rotated by means of a gear 86, fast on an upright shaft 87, journaled in bearings 88 of the upright 72. It has a bevel-gear 89 fast thereon which is meshed by a bevel-gear 90 fast on the shaft 143.

The plate 74 is provided with radially extending wings 91 located between proximate slots and having side contact walls 92, 93, whereby the pins are guided into the radial slots.

When a mold is positioned under the mouth of the glass-metal furnace for receiving the glass-metal therefrom, the stream of glass-metal falls directly from the lip of said mouth through the end 64 of the feed-passage of the feed-block, passing preferably unobstructedly through the discharge-opening 63 of said feed-passage into the mold. When a sufficient quantity of glass-metal has been received in the mold, the feed-block has movement imparted thereto, whereby the stream of glass metal is received upon the sloping wall 66 and the discharge-opening 63 is positioned to direct the flow of glass-metal away from the mold.

95 is a knife which coacts with the wall of the discharge-opening 63 to sever the stream of glass flowing into the mold and to deflect the stream from the furnace to outside the mold. The knife is shown as a stationary knife secured to the bracket 71 by means of bolts 96. Its rear face is provided with a trough-like channel 97 for receiving the continuation of the stream of glass-metal and directing the same to outside the mold, where it is suitably disposed of as by being received in a trough 98 suitably secured in position, as to the bracket 71 by bolts 99.

A knife 101 coacts with the upper end of the rear wall of the feed-passage, when the feed-block is again turned for placing the next feed-passage into registry with the succeeding mold. This knife 101 is preferably also a stationary knife and is shown secured to the bracket 71 by means of bolts 102. The knife 101 acts as a wiper to wipe the severed end of the stream quickly into the end of this next succeeding feed-passage, the stream of fresh glass-metal continuing into the next succeeding mold until a sufficient supply of glass-metal has been received in the mold for the next succeeding operation. The forward face of the knife 101 is provided with a trough-like recess 103.

During operation of the glass machine, suitable intermittent movements are imparted to the press-mold tables for bringing the press-molds into successive positions under the plunger and blow-head, the actions of the plunger and blow-head taking place during the positions of rest of the molds. The movements of the feed-block are so timed that the flow of glass-metal into the molds takes place during the positions of rest of the molds and that the deflection of flow of glass-metal therefrom is initiated just prior to the beginning of movement of the molds and ceases upon a new mold being moved into glass-metal receiving position. The movement of the molds, during which deflection of the flow of glass-metal takes place, is of shorter duration than the position of rest of the molds, whereby the deflection of the glass-metal takes place during only a small portion of the duration of flow of the glass-metal.

The flow of glass-metal is regulated in accordance with the speed of intermittent movements of the machine, the movements of the feed-block being also timed by adjustment of the pins on the pin-disk, so as to supply the molds with the proper amount of glass-metal.

In operation, in the exemplification of my invention herein shown and described, it will be assumed that the parts are in the relation shown in full lines in Fig. 9. When sufficient glass-metal has flowed into the mold, a movement is imparted to the feed-block by means of the pin 78 for moving the feed-block so that its feed-passage momentarily employed will move into the position shown in dotted lines in said figure, whereby the stream of glass-metal is severed at the lower end of the feed-block and deflected into the trough 98. A partial rotation of the mold-table having been effected for placing the next succeeding mold in position for receiving the stream of glass-metal, a second movement is imparted to the feed-block by the pin 77, whereby the stream of glass-metal from the furnace-mouth is severed at the upper end of said feed-block and wiped into the next succeeding feed-passage, which will meanwhile have been placed in the position shown in full lines in Fig. 9, the flow of glass-metal continuing until a sufficient quantity thereof has flowed into the mold.

There are two movements of the feed-block to each movement of the mold-table, one to cut off the glass-metal from below and deflect it away from the mold, which takes place just prior to the movement of the mold-table, and the other which cuts off the flow of glass-metal above and wipes the stream into the next succeeding feed-passage, which takes place during the latter portion of movement of the mold-table.

Means are provided whereby the glass-metal which is deflected is returned quickly to the glass-furnace for being again brought into suitable molten condition for flowing into the mold.

A cup 106 is arranged to receive the deflected molten glass from the trough. Endless chains 107, 107, shown as sprocket-chains, have suitable carrier-buckets 108 pivoted thereon being normally in upright position. The carrier-chains pass about sprocket-wheels 109, 110, 111, 112, 113 and 114, these sprocket-wheels being arranged in pairs respectively mounted on shafts 115, 116, 117, 118, 119 and 120, the shafts 115, 116 and 120 being respectively journaled in bearings 121, 122, 123, on the frame 105 shown secured to the wall of the furnace and the shafts 117, 118, and 119 being respectively journaled in bearings 124, 125, 126, of a hanger 127 shown secured to the wall of the furnace.

The wheels 109, 110, direct the carrier-chains in a stretch 128 for moving the carrier-buckets 108 under the cup 106 for having the contents of the cup deposited therein. The glass-metal deposited in the carrier-buckets then travels with the buckets along the stretches 129, 130, and when the buckets pass about the sprocket-wheels 112, they are tilted by means of pins 131 thereon striking the carrier-chains for dumping the contents of the buckets into a spout 132 projecting from the furnace and communicating with an inclined passage 133, whereby the molten glass deflected away from the molds is returned to the glass-furnace for being reheated into proper molten condition for being again received through the furnace mouth. A dividing wall 134 is in the body of glass in the glass-furnace between the passage 133 and the mouth 53.

The carrier-chains are suitably driven shown accomplished by means of a sprocket-chain 135 passing about sprocket-wheels 136, 137, respectively on the shaft 115 and on a shaft 139, journaled in bearings 140 in the frame 23. A gear 141 is on the shaft 139 and is meshed by a gear 142 on shaft 43. The gear 142 also meshes with the gear 145 on shaft 143 journaled in bearing 144 on the frame 23.

Suitable means are provided for dumping the cup 106 into the carrier-buckets when the latter are respectively in a position under the cup. Thus the cup is pivoted by means of pivots 148 in bearings 149 of brackets 150 extending from the main frame.

151 is a keeper which coacts with the lug 152 on the cup. The keeper is on a shaft 153 journaled in a bearing 154 on one of the brackets, the shaft being a rockable shaft and being arranged to be rocked for tripping the keeper by being provided with an arm 155 arranged to be struck by a pin 156 on the sprocket-chain, located just in advance of the carrier-bucket, a spring 157 normally retracting the keeper into range with the lug.

For returning the cup to normal position, an arm 158 is pivoted at 159 to one of the brackets 150, a link 160 being articulated with the arm at 161 and with the cup at 162. An inclined guide 163 located on and traveling with the sprocket-chain in a position in rear of the carrier-bucket is arranged to contact the arm and thereby raise the cup 106, so that its lug will be raised to a position above the keeper, the keeper being normally spring-pressed into range therewith for maintaining the cup in elevated position. The sprocket-chain is provided with a pin and an inclined guide at each of its carrier-buckets.

Having thus fully described my invention, what I claim as new and desire to secure by Letters Patent, is:

1. In a device of the character described, the combination of means for causing a constant flow of glass-metal, a series of molds adapted to be successively placed in glass-metal receiving position, means for automatically selectively causing said flow to and away from the mold in glass-metal receiving position at timed intervals comprising cutting off and glass-metal deflecting means, and means for operating said cutting off and glass-metal deflecting means comprising an adjustable member for adjusting the duration of said intervals.

2. In a device of the character described, the combination of means for causing a constant stream of glass-metal, a series of molds adapted to be successively placed in glass-metal receiving position, means for intermittently selectively moving said stream to and away from the mold in said glass-metal receiving position and cutting off said stream of glass-metal at each of said movements comprising cutting off and glass-metal deflecting means, and means for operating the latter comprising an adjusting member for adjusting the intervals between said movements.

3. In a device of the character described, the combination of means for causing a constant stream of glass-metal, said means comprising means for adjusting the size of said stream, a series of molds adapted to be successively placed in glass-metal receiving position, means for automatically alternately moving said stream to and away from the mold in said glass-metal receiving position and cutting off said stream at each of said movements, and means for adjusting the durations between said intermittent movements with relation to the successive movements of said series of molds, whereby to adjust the relation in time between the flowing of the stream of glass-metal to and away from the respective molds and the movements of said molds.

4. In a device of the character described, the combination of means for causing a constant stream of glass-metal comprising a glass-metal delivering part, a series of molds adapted to be successively placed in glass-metal receiving position in the line of said stream flowing by gravity in uncontacted relation from said glass-metal delivering part, and an interposed feed-block between said glass-metal delivering part and the mold in glass-metal receiving position provided with a feed-passage for the glass-metal in the line of said stream with all the walls of said feed-passage distanced from said stream, means for intermittently moving said feed-block, a cut-off knife between said feed-block and the mold in glass-receiving position for cutting off said stream of glass-metal from said mold at the completion of the feed of the glass-metal thereto and directing said stream away from all said molds, and a cut-off knife between said glass-delivering part and said feed-block for cutting off the stream of deflected glass-metal between said glass-metal delivering part and said feed-block at the beginning of flow of the glass-metal to the mold in glass-receiving position.

5. In a device of the character described, the combination of a series of molds provided with glass-metal receiving openings adapted to be successively placed in glass-metal receiving position, means for normally providing a constant stream of glass-metal the line of which is determined solely by gravity, a feed-block interposed in the line of said flow of glass-metal provided with a feeding passage having a discharge-opening normally in said line and a sloping wall sloping toward said discharge-opening, and being out of said line during flow of the glass-metal into said molds, and means for intermittently moving said feed-block for positioning said discharge-opening for registry with the glass-metal receiving openings of said molds when in said line in glass-metal receiving position or out of registry therewith when said sloping wall is in said line for directing said stream away from all the molds.

6. In a device of the character described, the combination of a series of molds provided with glass-metal receiving openings adapted to be successively placed in glass-metal receiving position, means for normally providing a constant stream of glass-metal the line of which is determined solely by gravity, a feed-block interposed in the line of said flow of glass-metal provided with a feeding passage having a discharge-opening in said line and a sloping wall sloping toward said discharge-opening and being out of said line during flow of the glass-metal into said molds, means for intermittently moving said feed-block for positioning said discharge-opening for registry with the glass-metal receiving opening of said molds when in said line in glass-metal receiving position or out of registry therewith when said sloping wall is in said line for directing said stream away from all the molds, and a glass-metal cut-off for said flow of glass-metal coacting with said feed-block.

7. In a device of the character described, the combination of a glass-furnace provided with a discharging mouth for supplying a stream of glass-metal, a series of molds, means for intermittently moving said molds into glass-receiving position, a feed-block having a discharge-opening through which said stream is received into said molds when in glass-metal receiving position, and a deflecting wall extending from said discharge-opening, a discharge trough, means for moving said discharge-opening out of registry with said mold and into registry with said trough, a conveyer, means for charging said conveyer from said discharge trough, said glass-furnace provided with a charging opening, and said conveyer arranged to coact with said opening for discharging the glass-metal in said buckets into said charging opening.

8. In a device of the character described, the combination of a glass-furnace having a discharging mouth for supplying a stream of glass-metal and a charging opening, a series of molds arranged to be successively arrested in glass-metal receiving position, a feed-block provided with a glass-metal passage having a discharge-opening and with a deflecting wall coacting with said discharge-opening, a trough, means for moving said feed-block for registry of said discharge-opening with said mold at glass-metal receiving position or with said trough, a cup into which said trough discharges, a conveyer comprising conveyer-buckets, and means for causing discharge of the glass-metal contents of said cup into said buckets, said buckets arranged for discharging into said charging opening of said glass-furnace.

In testimony whereof I have hereunto signed my name in the presence of two subscribing witnesses.

JOHN SCHIES.

Witnesses:
S. B. JOHNSON,
GERTRUDE SULLIVAN.